April 7, 1931.  H. G. TAYLOR  1,799,398
METHOD OF RECORDING SEISMIC WAVES
Filed April 6, 1928    2 Sheets-Sheet 1
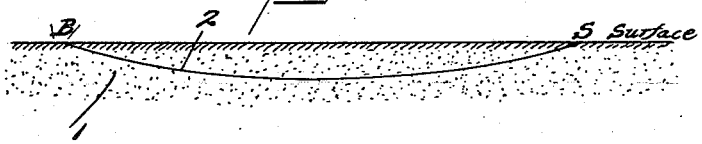
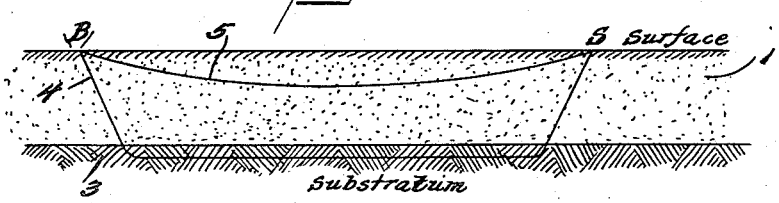
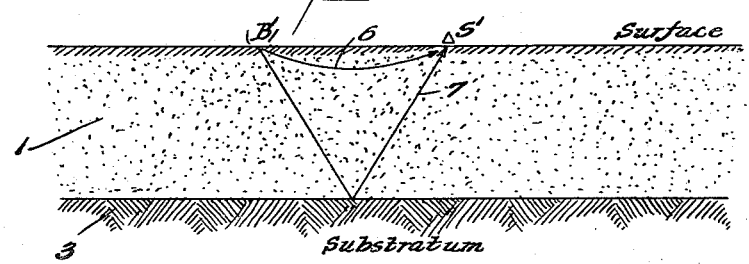
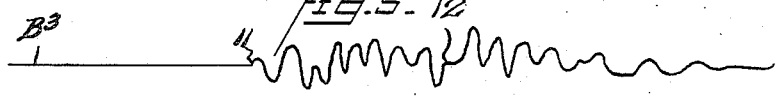
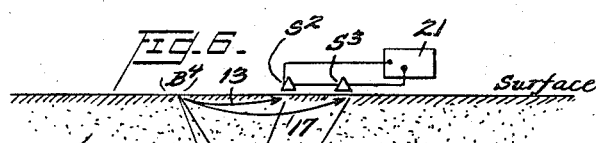
Inventor
Henry G. Taylor
By Watson, Coit, Morse & Grindle
Attorneys

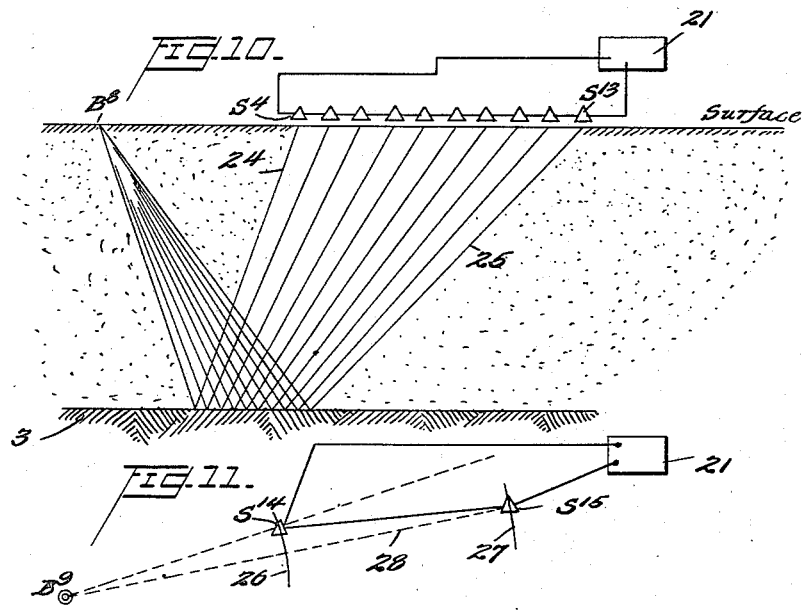

Patented Apr. 7, 1931

1,799,398

UNITED STATES PATENT OFFICE

HENRY GORDON TAYLOR, OF BEAUMONT, TEXAS, ASSIGNOR TO GEOPHYSICAL EXPLORATION COMPANY, OF BEAUMONT, TEXAS, A CORPORATION OF DELAWARE

METHOD OF RECORDING SEISMIC WAVES

Application filed April 6, 1928. Serial No. 267,974.

The invention relates to a method for ascertaining the presence, depth, shape and disposition of subsurface strata and other geologic structures in general.

With similar general objects in view, considerable research of this nature has already been carried out utilizing known principles of seismology. Several seismic methods have been employed with substantial success during recent years in commercial exploration work, particularly in the region bordering on the Gulf Coast.

Methods commonly used depend upon the fact that elastic waves in the earth travel through different materials at different rates of speed. Customary modes of procedure will necessarily be referred to hereinafter in connection with the detail description. This invention involves similar fundamental principles, but in addition thereto, makes use of the fact that when an artificially created elastic wave passes downwardly through the earth and encounters a medium of a substantially different velocity value, a certain portion of the energy of the wave will be reflected and returned to the surface of the earth.

Previous attempts to employ what may be called reflected waves have been heretofore unsuccessful because of the practical difficulty in recording the time of transmission of such waves. The indirect or reflected waves become so intermingled with what are herein termed direct waves, that is, waves traveling directly without reflection, that it has not been possible to distinguish the direct and the indirect waves on a wave record made by a suitable seismograph.

It is the general object of this invention to provide a method by which a reflected wave is more strongly recorded on a seismogram, and by which other waves are partly or wholly eliminated from the seismogram, making it thereby possible to measure with certainty the time required for an artificially created seismic wave to travel from the surface of the earth down to a reflecting discontinuity and back to the surface, from which data the distance to the reflecting discontinuity may be computed.

On account of the nature of this invention, the specific objects and advantages thereof, may be more readily understood if considered in view of the following discussion, and the several diagrams on the drawing, in which:

Figs. 1, 2, 3, 6 and 10 represent vertical sections through the surface of the earth;

Figs. 4, 5, 7, 8 and 9 are diagrams representing wave forms described hereinafter;

Fig. 11 is a plan view of an alternative arrangement of seismometers on the surface of the earth, and Fig. 12 is a plan view of a second alternative arrangement of seismometers on the surface of the earth.

In order that the present invention may be more readily understood and appreciated, it is desirable to refer briefly to the prior art.

As previously mentioned, customary methods in use at present rely upon the fact that elastic waves in the earth travel through different materials at different rates of speed. For example, the velocity of a wave in a hard rock is much greater than the velocity of a like wave passing through loose, unconsolidated sediments. According to the known practice, if a determination is made of the time required for artificially created elastic waves to travel from a center of disturbance, such as a blast of dynamite or other explosive, to a recording seismograph located some distance away, it is a simple matter to say whether or not a hard bedrock exists above a certain depth in the intervening area.

This may be illustrated in connection with Fig. 1 in which 1 represents loose, unconsolidated material forming a part of the earth's crust; B the location of a charge of dynamite or other explosive; and S, a seismograph. If the explosive at B is detonated, elastic waves set up thereby will pass through sediments 1 approximately over the path 2 to the seismograph S located, for instance, at a point a mile or more away from B. This assumes that the material traversed by the waves is alike throughout its depth. If the time required for a wave to pass from B to S over path 2 is normal for that type of material, then it may be concluded that the continuity of sediments 1 is uninterrupted by hard, dense intrusions or formations of a substantially different character.

But if however, the area under investigation should be underlain by a dense, hard substratum as represented by 3 in Fig. 2, it will be found that the time required for a wave to travel from B to S will be abnormally short, because certain waves will pass over path 4, and on account of the greater density of substratum 3, will travel at a greater velocity, and will reach S somewhat before direct waves passing over path 5 through the unconsolidated sediments 1. Under these circumstances it may be concluded that the area under investigation is in fact underlain by a substratum of a density different than that of the surface materials.

The foregoing is known to those skilled in the art.

This invention describes a method for ascertaining the time required for an artificially created seismic wave to pass downwardly to the upper surface of a substratum of different density and back to the surface of the earth. The method is based on the fact that whenever an earth wave passes from one medium to another it is partially reflected, provided that there is a difference in the density of the media.

Fig. 3 represents a vertical section through the surface of the earth wherein the unconsolidated sediments 1 are underlain by a more dense substratum 3.

If a charge of dynamite or other explosive is detonated at B', earth waves are propagated in all directions, some traveling through the earth to a seismograph S' located a few hundred feet from the blast. Direct waves from the blast pass along comparatively near the surface of the earth over a path 6, while other waves, called indirect waves herein, pass downwardly to the surface of substratum 3, are reflected upwardly therefrom, and reach the seismograph S' after having traveled approximately over the path 7.

It would seem that, from a record made by the seismograph S', indirect and direct waves could be easily distinguished as by a wave form 8 represented in Fig. 4. In this diagram, if $B_2$ represents the instant of the blast, the direct waves traveling near the surface of the earth over path 6 would reach the seismograph and be recorded at the instant denoted by point 9, and the indirect waves moving over path 7 would arrive at the seismograph S' somewhat later than the direct waves and would appear on the wave form as at 10. But Fig. 4 represents an idealized wave form, and not a true record of what would appear on a seismogram actually made by the seismograph S'.

In this situation, Fig. 5 represents more accurately the record of wave forms arriving at seismograph S'. If $B_3$ represents the instant of the blast, the direct waves propagated therefrom, moving over path 6, would first appear on the record at 11. However, the wave from the blast does not arrive at S' as a single impulse, but rather as a sustained disturbance, as represented on the record between 11 and 12 and thereafter. Approximately at 12 the indirect waves passing over path 7 begin to arrive, and it is apparent that these waves will be mingled with the direct waves and form a continuous disturbance in which the direct waves are indistinguishable from the indirect waves.

The problem would be simple if the reflected wave could be easily recognized on the seismograph record, because, knowing the time interval between the instant of the blast and the return of the reflected wave to the surface of the earth, and the average velocity of the elastic waves in such sediments, the depth of the reflecting surface may be computed.

However, from Fig. 5 it will be apparent that the difficulty lies in the fact that the reflected wave is obscured by the direct waves, because the energy traveling direct from the blast to the seismograph does not arrive as a single impulse, but continues for several seconds, thereby rendering the direct and indirect waves indistinguishable.

It will be understood, of course, that all seismograms made for this purpose contain a series of equally spaced time-marks, placed thereon by mechanical means incorporated in a recording instrument mentioned hereinafter.

Now it is the aim of this invention to substantially eliminate the direct waves from the seismogram altogether, and also to improve the registration of the indirect waves.

The reflected waves are quite similar to the direct waves, but they may be expected to have much less amplitude and energy at the seismograph for the reason that they have traveled a greater distance and because only a portion of the energy reaching the surface of substratum 3 is reflected therefrom. Both of these features, i. e., the similarity of the waves and the weak energy of the reflected waves, combine to increase the difficulty of recognizing the reflected wave on the seismogram.

There is one point of difference, however, between the direct and indirect waves, and that is the direction from which the waves arrive at the seismograph. From an inspection of Figs. 3, 6 and 10 it will be apparent that the direct waves travel more or less horizontally, while the indirect waves are more nearly vertical. The latter is the basis of the method described herein which makes use of this difference of direction from which the indirect waves arrive at the seismograph, and by virtue of this difference the direct waves may be eliminated and the registration of the indirect waves may be amplified.

It has been found that in areas where the surface sediments are fairly uniform in character that if a charge of explosive is detonated, on or near the surface of the earth, artificial, seismic waves are propagated which usually have one, but perhaps may have two or more characteristic wave lengths, depending upon the nature of the sediments. In a certain section it has been found, for instance that the predominating wave length of seismic waves propagated in the sediments is two hundred feet. Let it be assumed therefore that the sediments represented by 1 in Figs. 3 and 6 have a characteristic, predominating wave length of two hundred feet.

In Fig. 6 two seismometers $S_2$ and $S_3$ are located in a line a few hundred feet from $B_4$, the location of a blast. Waves originating at $B_4$ reach seismometer $S_2$ by way of paths 13 and 14, and ordinarily the seismogram taken at $S_2$ would have the appearance of the wave form shown in Fig. 7. In this diagram $B_5$ represents the instant of the blast, and the direct waves moving over path 13 would arrive at seismometer $S_2$ at 15, and the indirect waves coming from $B_4$ over path 14 would arrive at $S_2$ at approximately 16. The direct waves from $B_4$ travel over path 17 to seismometer $S_3$, while the indirect waves are carried over path 18. Under ordinary circumstances the seismogram recorded at $S_3$ would have the appearance approximately as shown in Fig. 8 wherein $B_6$ denotes the instant of the blast, 19 the arrival of the direct wave over path 17 and 20 the arrival of the indirect wave over the path 18.

Now, it is a known fact that points one-half wave length apart on a wave train are opposite in phase, so that a combination of the effects of the waves at the two points would be zero. Therefore, if the wave length in sediments 1 is two hundred feet, and if seismometers $S_2$ and $S_3$ are one hundred feet apart, direct waves from $B_4$ arriving at seismometers $S_2$ and $S_3$, respectively, are in opposite phase, and if the seismometers were properly connected, impulses received by $S_2$ would completely counteract those received by $S_3$.

To effect this, seismometers $S_2$ and $S_3$ may be any known types of electrical seismometers connected to each other and to a recording instrument 21 in series.

It will be apparent therefore, that, as the seismometers are in series the direct waves from $B_4$ counteract each other in their effect at the recording instrument. Therefore, no curve is made on the seismogram by the direct waves. However, the indirect waves arriving at the several seismometers over paths 14 and 18, strike the seismometers at practically the same time and as these waves are nearly in phase, they do not nullify each other, but on the contrary, the added effect of the impulses received by the seismometers from the indirect waves will be recorded.

By means of this arrangement a seismogram represented by Fig. 9 will be obtained from the recording instrument 21. On this seismogram, $B_7$ denotes the instant of the blast. As the direct waves are completely out of phase at the seismometers $S_2$ and $S_3$, they neutralize each other, and there is substantially no appearance on the wave form of the direct waves traveling over paths 13 and 17. But as mentioned before, the indirect waves strike the seismometers at substantially the same instant, and therefore the effect produced in the recording instrument by the two seismometers is considerably more than the effect which would be produced by one seismometer. The wave form which represents the indirect waves has therefore a clear-cut starting point as at 22, and from this clearly defined point, the time elapsed between $B_7$ and 22 may be readily determined by means of time marks previously mentioned, and which appear on the record as equally spaced vertical lines 23.

From Fig. 6 it will be seen that there is a difference in the length of paths 14 and 18. This difference should be limited so that a wave passing over path 18 will not be more than 90° out of phase with respect to the wave moving over path 14 at the time of arrival at the several seismometers.

It will be understood, that in practical field work, this condition is easily realized by allowing the proper distance between the seismometers and the blast. For, if the seismometers are sufficiently close to the blast, the difference in length of the paths is slight and therefore negligible.

In some localities conditions may be such that waves of two different wave lengths are propagated in the sediments by a blast. This situation has been assumed in Fig. 10 wherein, for example, the waves have a wave length of say forty and two hundred feet.

In this instance ten seismometers $S_4 \ldots S_{13}$ are set up, equally spaced, twenty feet apart in a line with $B_8$ which represents the location of a blast. As the electrical seismometers $S_4 \ldots S_{13}$ are all in series, the recording instrument 21 records the algebraic sum of the effects produced at the ten separate seismometers.

In this situation, also, the most remote seismometer $S_{13}$ should be near enough to the blast, so that the lengths of paths 24 and 25 will be such that the indirect waves will not be more than about 90° out of phase.

These ten points are nearly in phase for the indirect waves, so that their combined effect is large. But for the forty foot direct waves each point is neutralized by another point twenty feet away, while for the two hundred foot direct waves each point is neutralized by another point one hundred feet away.

In Figs. 6 and 10 the seismometers have been shown in a straight line with the blast, that is, so that the seismometers and the location of the blast are all in a common vertical plane. This particular arrangement is not essential as will be seen from Fig. 11 which is a plan view showing a center of disturbance at $B_9$ and two seismometers $S_{14}$ and $S_{15}$. It is only necessary to place the seismometers $S_{14}$ and $S_{15}$ on the surface of the earth in such manner that the distance between the seismometers measured on any radius from the center of disturbance is such as to equal one-half the wave length which predominates in the sediments of that area, that is, the distance between arcs 26 and 27 measured on the line 28 equals one-half the wave length of the predominating wave. In this situation the seismometers and the recording instrument are connected in series as described above.

When the time required for a wave to pass from the blast to the reflecting surface of the substratum and back to the seismometers has been obtained from the seismogram, the vertical depth of the upper surface of substratum 3 may be obtained by interpolation from depth-time-velocity tables, well known to those skilled in the art.

The principle of connecting two or more electrical seismometers in series has a further application in ordinary long distance work referred to in connection with Figs. 1 and 2. Fig. 12 represents a plan view in which $B_{10}$ is a center of disturbance and $S_{16} \ldots S_{21}$ are seismometers located in a line lying at right angles to the direction of propagation of the seismic waves from $B_{10}$. Seismometers $S_{16} \ldots S_{21}$ are connected in series to a recording instrument 21 as previously described. Waves originating at $B_{10}$ pass out therefrom in all directions, one wave front being represented by the arc 26. It will be apparent that these waves will strike seismometers $S_{16} \ldots S_{21}$ at substantially the same moment, and therefore the effect on the recording instrument 21 will be just $n$ times that which would be produced by one seismometer alone. On the other hand, undesirable disturbances such as those caused by wind, should, since they would ordinarily come from all directions, suffer as much by destructive interferences as they gain by constructive interference, so that the combined effect of wind and other foreign disturbances should not be greater than that which one instrument alone would register. This arrangement is particularly adaptable for long distance work where several miles may intervene between $B_{10}$ and the seismometers, and where the record is usually weak and foreign disturbances are troublesome.

The combination of instruments referred to can be easily accomplished by the use of several electrical seismometers, a few of which will now be described.

The Galitzien seismometer is a moving coil type, and is so constructed that, as the instrument responds to the motion of the earth, a coil in the instrument is made to move in a magnetic field. Consequently, an electric current is generated in the coil and is conducted through a cable to a galvanometer which registers photographically to produce a seismogram. In this manner an accurate record is obtained because the current induced in the coil corresponds in intensity and direction to the motion of the earth.

Another type of electrical seismometer suggested for this work employs a carbon button in place of the moving coil. Pressure on the carbon button is made to vary in response to the motion of the earth, and since this changes the resistance of the carbon button, the current flowing in the circuit, when a constant E. M. F. is provided, must vary. A galvanometer in the circuit records the current changes as in the case of the Galitzien seismometer.

A third type of seismometer employs a condenser in place of the moving coil or carbon button. The earth motion causes the distance between the plates of the condenser to change, and this changes the characteristics of a radio-frequency circuit sufficiently to operate a galvanometer or oscillograph. Amplification by means of vacuum tubes may be accomplished with any of these electrical instruments.

As each of the electrical seismometers, just described as the unit which produces or varies the current, is separate from the recording apparatus, there is no difficulty in connecting several of these instruments together in series, provided that they are alike, so that they record jointly as required by the instant method.

By the method described, a composite seismogram is produced, but it should also be noted that the same seismogram could be produced by taking separate seismograph records at each of the seismometer locations and then combining these into a single curve by means of an integrating machine. The curve so produced would be identical with the seismogram produced by the seismometers arranged according to the foregoing description, but as the procedure of combining a number of separate curves into a single curve would be impractical, this method is probably not desirable for field use. Nevertheless, an operation of this sort would fall within the general scope of a method of minimizing the waves coming directly from a blast by destructive interference and amplifying the reflected waves by constructive interference.

Instead of using several seismometers with a single blast, it is equally advantageous to use several blasts with a single seismometer. For instance, in Fig. 6 if blasts were substituted for seismometers $S_2$ and $S_3$ and a single seismometer substituted at the location of the blast $B_4$, the same phase relations would hold and exactly the same composite seismogram would result. There is no practical difficulty in shooting the blasts simultaneously if electric detonators are used. It is evident that by following this procedure mechanical seismometers may be used.

Foreign disturbances arriving from various directions may in general be expected to be out of phase at the various instruments placed according to the various arrangements described, so that the combined effects should not be greater than that produced on one instrument alone. Since foreign disturbances, especially wind, are at present governing factors limiting the sensitivity of seismometers and the strength of the dynamite charges which can be used on long shots, it is evident that the combination of instruments here proposed affords many advantages in this respect.

Having thus described the invention, what is claimed as new and desired to be secured by Letters Patent is:

1. The method of exploring geological formations which comprises creating a center of disturbance in the surface of the earth from which seismic waves are propagated, placing a plurality of seismometers at points removed from the center of disturbance, connecting the seismometers to a recording instrument, and recording the algebraic sum of the impulses received by the seismometers.

2. The method of exploring geological formations which comprises creating a center of disturbance in the surface of the earth from which seismic waves are propagated, placing a plurality of seismometers at points removed from the center of disturbance, connecting the seismometers to each other and to a recording instrument and recording the combined effect of the impulses received by the seismometers.

3. The method of exploring geological formations which comprises creating a center of disturbance in the surface of the earth from which seismic waves are propagated, placing a plurality of seismometers at points removed from the center of disturbance, connecting the seismometers and a recording instrument in series, and recording the combined effect of the impulses received by the seismometers.

4. The method of exploring geological formations which comprises creating a center of disturbance in the surface of the earth from which seismic waves are propagated, placing a plurality of electrical seismometers at points removed from the center of disturbance, electrically connecting the seismometers to each other and to a recording instrument, recording the combined effect of the impulses set up in the seismometers by the action of the seismic waves.

5. The method of exploring geological formations, which comprises creating a center of disturbance in the surface of the earth from which seismic waves are propagated, placing a plurality of electrical seismometers at points removed from the center of disturbance, connecting the seismometers and a recording instrument in series and recording the combined effect of the impulses set up in the seismometers by the action of the seismic waves.

6. The method of exploring geological formations which comprises creating a center of disturbance in the surface of the earth from which seismic waves are propagated, placing a plurality of seismometers at points removed from the center of disturbance, so that the seismometers and the center of disturbance are in a common vertical plane, connecting the seismometers to a recording instrument and recording the algebraic sum of the impulses received by the seismometers.

7. The method of exploring geological formations which comprises creating a center of disturbance in the surface of the earth from which seismic waves are propagated, placing a plurality of seismometers at points removed from the center of disturbance, so that the seismometers and the center of disturbance are in a common vertical plane, connecting the seismometers to each other and to a recording instrument and recording the combined effect of the impulses received by the seismometers.

8. The method of exploring geological formations which comprises creating a center of disturbance in the surface of the earth from which seismic waves are propagated, placing a plurality of seismometers at points removed from the center of disturbance, so that the seismometers and the center of disturbance are in a common vertical plane, connecting the seismometers and the recording instrument in series and recording the combined effect of the impulses received by the seismometers.

9. The method of exploring geological formations which comprises creating a center of disturbance in the surface of the earth from which seismic waves are propagated, placing a plurality of electrical seismometers at points removed from the center of disturbance so that the seismometers and the center of disturbance are in a common vertical plane, connecting the seismometers to a recording instrument, and recording the impulses set up in the seismometers by the action of the seismic waves thereon.

10. The method of exploring geological formations which comprises creating a center of disturbance in the surface of the earth from which seismic waves are propagated, placing a plurality of electrical seismometers at points removed from the center of disturbance so that the seismometers and the center of disturbance are in a common vertical plane, electrically connecting the seismometers to each other and to a recording instrument and recording the impulses set up in the seismometers by the action of the seismic waves thereon.

11. The method of exploring geological formations which comprises creating a center of disturbance in the surface of the earth from which seismic waves are propagated, placing a plurality of electrical seismometers at points removed from the center of disturbance so that the seismometers and the center of disturbance are in a common vertical plane, electrically connecting the seismometers and a recording instrument in series and recording the impulses set up in the seismometers by the action of the seismic waves thereon.

12. The method of exploring geological formations which comprises creating a center of disturbance at the surface of the earth in sediments of such character that seismic waves of a substantially constant wave length are propagated therein, placing a plurality of seismometers at points successively spaced from the center of disturbance in such manner that a succeeding seismometer is farther removed from the center of disturbance than the preceding seismometer by an amount equal to half the length of the seismic waves propagated, connecting the seismometers to a recording instrument and recording the algebraic sum of impulses received by the seismometers.

13. The method of exploring geological formations which comprises creating a center of disturbance at the surface of the earth in sediments of such character that seismic waves of a substantially constant wave length are propagated therein, placing a plurality of seismometers at points successively spaced from the center of disturbance in such manner that a succeeding seismometer is farther removed from the center of disturbance than the preceding seismometer by an amount equal to half the length of the seismic waves propagated, connecting the seismometers and a recording instrument in series and recording the combined effect of impulses received by the seismometers.

14. The method of exploring geological formations which comprises creating a center of disturbance at the surface of the earth in sediments of such character that seismic waves of a substantially constant wave length are propagated therein, placing a plurality of electrical seismometers at points successively spaced from the center of disturbance in such manner that a succeeding seismometer is farther removed from the center of disturbance than the preceding seismometer by an amount equal to half the length of the seismic waves propagated, electrically connecting the seismometers to a recording instrument and recording the algebraic sum of the impulses received by the seismometers.

15. The method of exploring geological formations which comprises creating a center of disturbance at the surface of the earth in sediments of such character that seismic waves of a substantially constant wave length are propagated therein, placing a plurality of electrical seismometers at points successively spaced from the center of disturbance in such manner that a succeeding seismometer is farther removed from the center of disturbance than the preceding seismometer by an amount equal to half the length of the seismic waves propagated, electrically connecting the seismometers and a recording instrument in series and recording the combined effect of the impulses received by the seismometers.

16. The method of exploring geological formations which comprises creating a center of disturbance at the surface of the earth in sediments of such character that seismic waves of a substantially constant wave length are propagated therein, placing a plurality of seismometers at points successively spaced from the center of disturbance in such manner that seismometers and the center of disturbance lie in a common vertical plane and so that a succeeding seismometer is spaced beyond a preceding seismometer a distance equal to half the length of the seismic waves propagated, connecting the seismometers to a recording instrument and recording the algebraic sum of the impulses received by the seismometers.

17. The method of exploring geological formations which comprises creating a center of disturbance at the surface of the earth in sediments of such character that seismic waves of a substantially constant wave length are propagated therein, placing a plurality of electrical seismometers at points successively spaced from the center of disturbance in such manner that a succeeding seismometer is farther removed from the center of disturbance than the preceding seismometer by an amount equal to half the length of the seismic waves propagated, electrically connecting the seismometers to a recording instrument and recording the algebraic sum of impulses received by the seismometers.

18. The method of exploring geological formations which comprises creating a center of disturbance at the surface of the earth in sediments of such character that seismic waves of a substantially constant wave length are propagated therein, placing a plurality of electrical seismometers at points successively spaced from the center of disturbance in such manner that the seismometers and the center of disturbance lie in a common vertical plane and so that a succeeding seismometer is spaced beyond a preceding seismometer a distance equal to half the length of the seismic waves propagated, electrically connecting the seismometers and recording instrument in series, and recording the algebraic sum of the impulses received by the seismometers.

19. The method of exploring geological formations in an area having a substratum of different density than the overlying strata which comprises creating a center of disturbance at the surface of the earth from which seismic waves are propagated in all directions, placing a plurality of seismometers at points removed from the center of disturbance, spacing the seismometers apart so that substantially horizontal waves are out of phase on arrival at the seismometers, connecting the seismometers to each other and to a recording instrument and recording the algebraic sum of the impulses received by the seismometers, whereby horizontal waves are eliminated from the record and the combined effect of the waves reflected from the substratum is recorded.

20. The method of exploring geological formations in an area having a substratum of different density than the overlying strata which comprises creating a center of disturbance at the surface of the earth from which seismic waves are propagated in all directions, placing a plurality of seismometers at points removed from the center of disturbance, spacing the seismometers apart so that substantially horizontal waves are out of phase on arrival at the seismometers, electrically connecting the seismometers and a recording instrument in series and recording the algebraic sum of the impulses received by the seismometers, whereby horizontal waves are eliminated from the record and the combined effect of the waves reflected from the substratum is recorded.

21. The method of exploring geological formations in an area having a substratum of different density than the overlying strata which comprises creating a center of disturbance at the surface of the earth from which seismic waves are propagated in all directions, placing a plurality of seismometers at points removed from the center of disturbance, so that the seismometers and the center of disturbance are in a common vertical plane, spacing the seismometers apart so that substantially horizontal waves are out of phase on arrival at the seismometers, electrically connecting the seismometers and recording instrument in series and recording the algebraic sum of the impulses received by the seismometers, whereby horizontal waves are eliminated from the record, and the combined effect of the waves reflected from the substratum is recorded.

22. The method of exploring geological formations in an area having a substratum of different density than the overlying strata, which comprises creating a center of disturbance at the surface of the earth in overlying strata of such character that seismic waves of a plurality of different wave lengths are propagated in all directions, placing a plurality of seismometers at points removed from the center of disturbance, spacing the seismometers apart so that horizontal waves of all wave lengths are out of phase on arrival at the seismometers, connecting the seismometers and a recording instrument in series and recording the algebraic sum of the impulses received by the seismometers, whereby horizontal waves are eliminated from the record and the combined effect of waves reflected from the substratum is recorded.

23. The method of exploring geological formations in an area having a substratum of different density than the overlying strata which comprises creating a center of disturbance at the surface of the earth in overlying strata of such character that seismic waves of a plurality of different wave lengths are propagated in all directions, placing a plurality of electrical seismometers at points removed from the center of disturbance, spacing the seismometers apart so that horizontal waves of all wave lengths are out of phase on arrival at the seismometers, electrically connecting the seismometers and a recording instrument in series and recording the algebraic sum of the impulses received by the seismometers, whereby horizontal waves are eliminated from the record and the combined effect of the waves reflected from the substratum is recorded.

24. The method of exploring geological formations which comprising creating a center of disturbance in the surface of the earth from which seismic waves are propagated, placing a plurality of seismometers at points removed from the center of disturbance and making a composite record of the impulses received by the seismometers.

25. The method of exploring geological formations which comprises creating a plurality of centers of disturbance in the surface of the earth from which seismic waves are propagated, placing a seismometer at a point removed from the centers of disturbance and making a composite record of the impulses received by the seismometer.

In testimony whereof I hereunto affix my signature.

HENRY GORDON TAYLOR.